(12) United States Patent
Chang et al.

(10) Patent No.: US 10,593,046 B2
(45) Date of Patent: Mar. 17, 2020

(54) OBJECT COUNTING METHOD HAVING ROUTE DISTRIBUTION PROPERTY AND RELATED IMAGE PROCESSING DEVICE

(71) Applicant: VIVOTEK INC., New Taipei (TW)

(72) Inventors: Hung-Chih Chang, New Taipei (TW); Shin-Jei Tsung, New Taipei (TW); Chinn-Rong Chern, New Taipei (TW)

(73) Assignee: VIVOTEK INC., New Taipei (TW)

( * ) Notice: Subject to any disclaimer, the term of this patent is extended or adjusted under 35 U.S.C. 154(b) by 229 days.

(21) Appl. No.: 15/936,335

(22) Filed: Mar. 26, 2018

(65) Prior Publication Data

US 2018/0276829 A1    Sep. 27, 2018

(30) Foreign Application Priority Data

Mar. 27, 2017   (TW) .............................. 106110081 A (51) Int. Cl.
 *G06T 7/20*     (2017.01)
 *G06T 7/246*    (2017.01)

(52) U.S. Cl.
 CPC ............... *G06T 7/20* (2013.01); *G06T 7/246* (2017.01); *G06T 2207/10016* (2013.01); *G06T 2207/30232* (2013.01); *G06T 2207/30241* (2013.01); *G06T 2207/30242* (2013.01)

(58) Field of Classification Search
 CPC .. G06T 7/20; G06T 7/246; G06T 7/70; G06T 2207/30232; G06T 2207/30241; G06T 2207/30242; G06K 9/50; G06M 11/00
 See application file for complete search history.

(56) References Cited

U.S. PATENT DOCUMENTS

| 2013/0265420 | A1* | 10/2013 | Adachi | G06K 9/00771 348/143 |
| 2014/0161312 | A1* | 6/2014 | Adachi | G06K 9/00362 382/103 |
| 2016/0134810 | A1* | 5/2016 | Morofuji | H04N 5/23238 348/36 |
| 2017/0039728 | A1* | 2/2017 | Bamba | G08B 13/19602 |

FOREIGN PATENT DOCUMENTS

| CN | 101021949 A | 8/2007 | |
| CN | 102054167 A | 5/2011 | |
| CN | 105574501 A | 5/2016 | |
| CN | 105608419 A | 5/2016 | ............... G06K 9/00 |

* cited by examiner

*Primary Examiner* — Andrew W Johns
(74) *Attorney, Agent, or Firm* — Winston Hsu (57) ABSTRACT

An object counting method having route distribution property is applied to an image processing device. The object counting method includes steps of recording an initial position datum and a final position datum of any object moving within an image frame, setting at least one detection line inside the image frame, determining whether a connection line between the initial position datum and the final position datum moves across the detection line, and drawing an object distribution diagram by relation between an amount of the object moving across the detection line and its detective period.

20 Claims, 8 Drawing Sheets

OBJECT COUNTING METHOD HAVING ROUTE DISTRIBUTION PROPERTY AND RELATED IMAGE PROCESSING DEVICE

BACKGROUND OF THE INVENTION

1. Field of the Invention

The present invention relates to an object counting method and a related image processing device, and more particularly, to an object counting method and a related image processing device having route distribution property.

2. Description of the Prior Art

Figure 8:
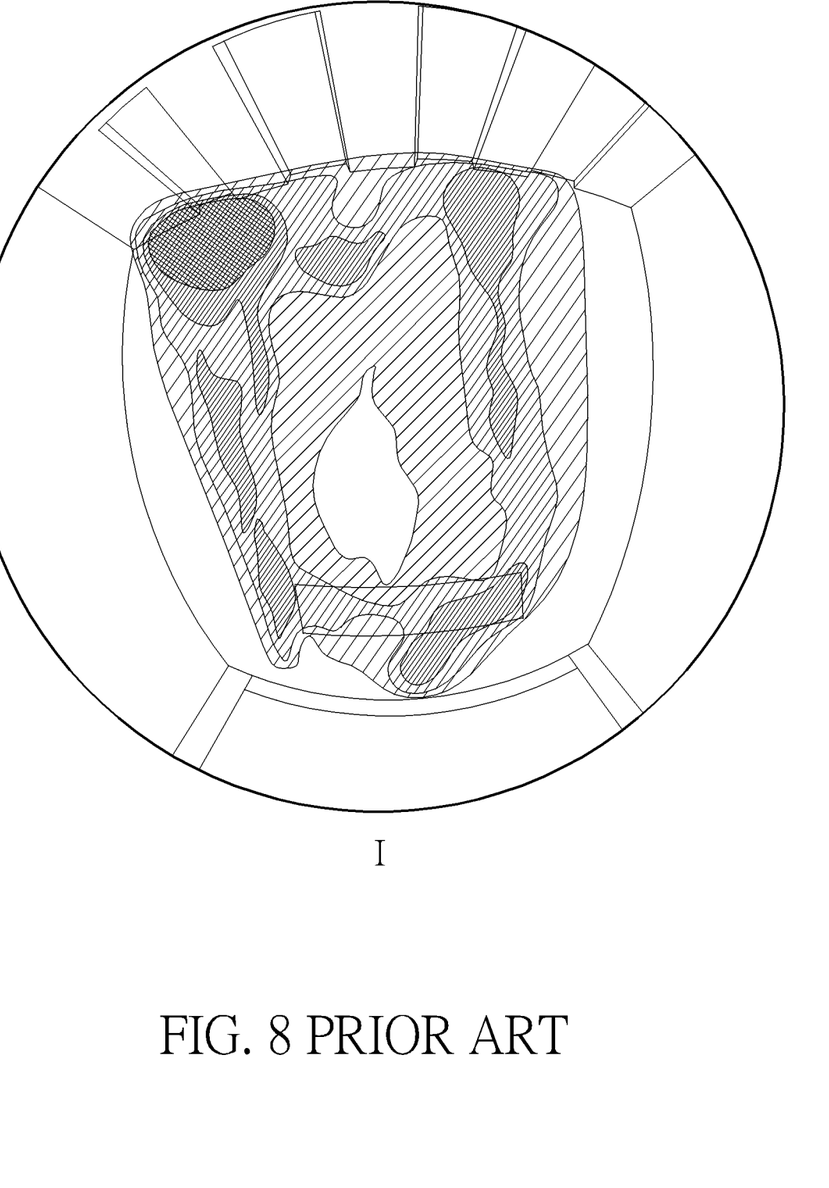
FIG. 8 is a heat map showed by an image monitoring apparatus in prior art.

Please refer to FIG. 8. FIG. 8 is a heat map showed by an image monitoring apparatus in prior art. The image monitoring apparatus records moving trace information of all objects within the monitoring area of the image monitoring apparatus, and a tracing point of each object at every point of time is marked onto the monitoring frame. The heat map utilizes color variation to show density of the tracing point, and variation of line density is represented as the color variation shown in FIG. 8. Therefore, the conventional object distribution heat map only shows an integrated distribution result, and does not show position distribution variation of the object at different points of time. Design of a new-typed object counting method capable of showing route distribution property in different timing is an important issue in the related monitoring industry.

SUMMARY OF THE INVENTION

The present invention provides an object counting method and a related image processing device having route distribution property for solving above drawbacks.

According to the claimed invention, an object counting method having route distribution property includes recording an initial position datum and a final position datum of any object moving within an image frame, setting at least one detection line inside the image frame, determining whether a connection line from the initial position datum to the final position datum of each object moves across the detection line, and drawing an object distribution diagram by relation between an amount of the object having the connection line moving across the detection line and every point of time in a movement of the object.

According to the claimed invention, an image processing device having route distribution property includes an image producer, a display and an operational processor. The image producer is adapted to capture an image frame. The display is adapted to display the image frame. The operational processor is electrically connected to the image producer and display. The operational processor is adapted to record an initial position datum and a final position datum of any object moving within an image frame, to set at least one detection line inside the image frame, to determine whether a connection line from the initial position datum to the final position datum of each object moves across the detection line, and to draw an object distribution diagram by relation between an amount of the object having the connection line moving across the detection line and every point of time in a movement of the object.

The object counting method and the related image processing device of the present invention can record the varied position data of the object moving within the monitoring area to acquire position data of the object moving trace at every point of time, and exclude the uninterested moving trace in accordance with the position, length and orientation of the detection line inside the image frame, so as to draw the object distribution diagram by the relation between the amount of the object having the moving trace crossed with the detection line and its point of time. The object counting method and the related image processing device of the present invention can clearly show the route distribution property of the object's amount moving along the specific direction in different points of time by a graphic form, for conveniently analyzing and computing flow variation of the object moving along the specific direction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
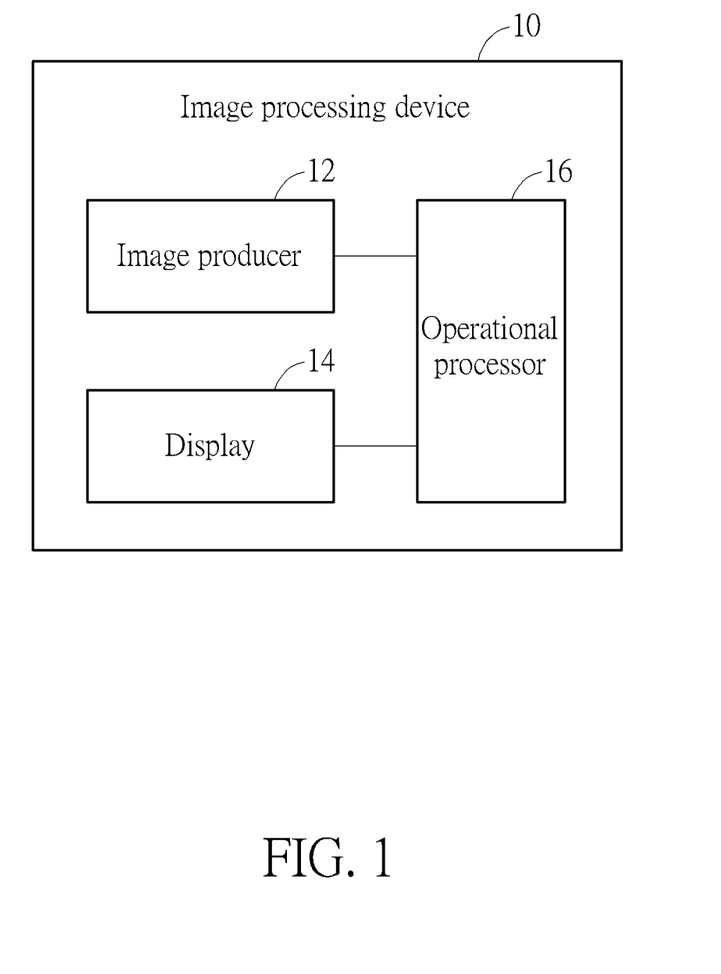
FIG. 1 is a functional block diagram of an image processing device according to an embodiment of the present invention.
Figure 2:
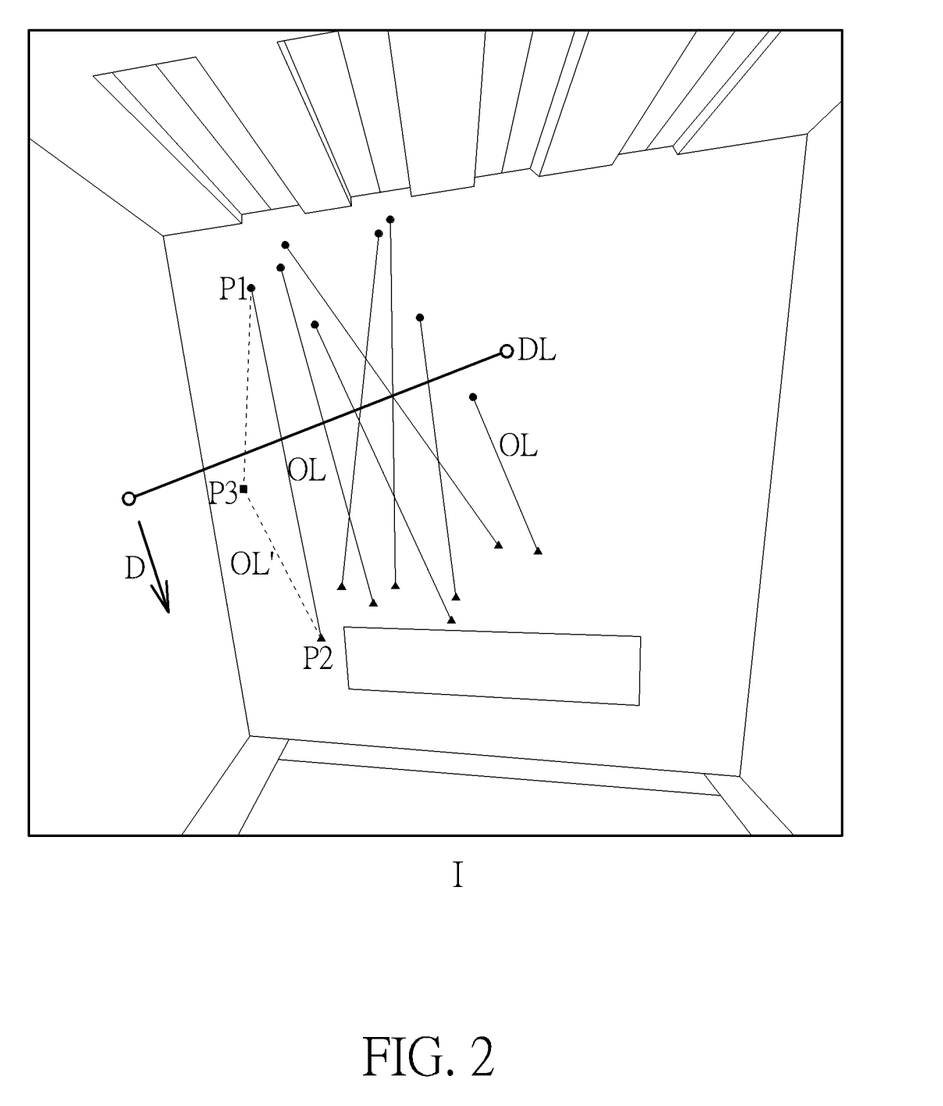
FIG. 2 and FIG. 3 respectively are diagrams of an image frame displayed by the image processing device according to different embodiments of the present invention.
Figure 3:
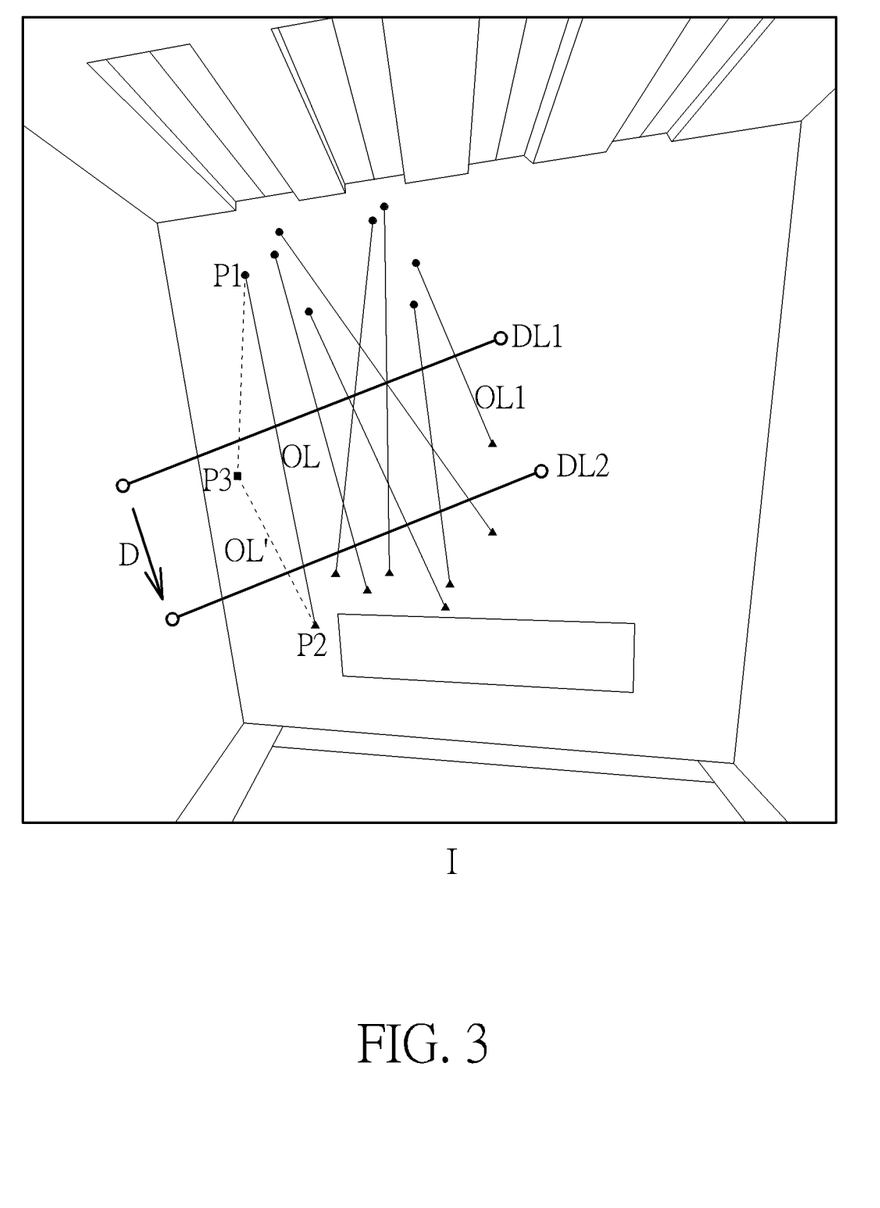
Figure 4:
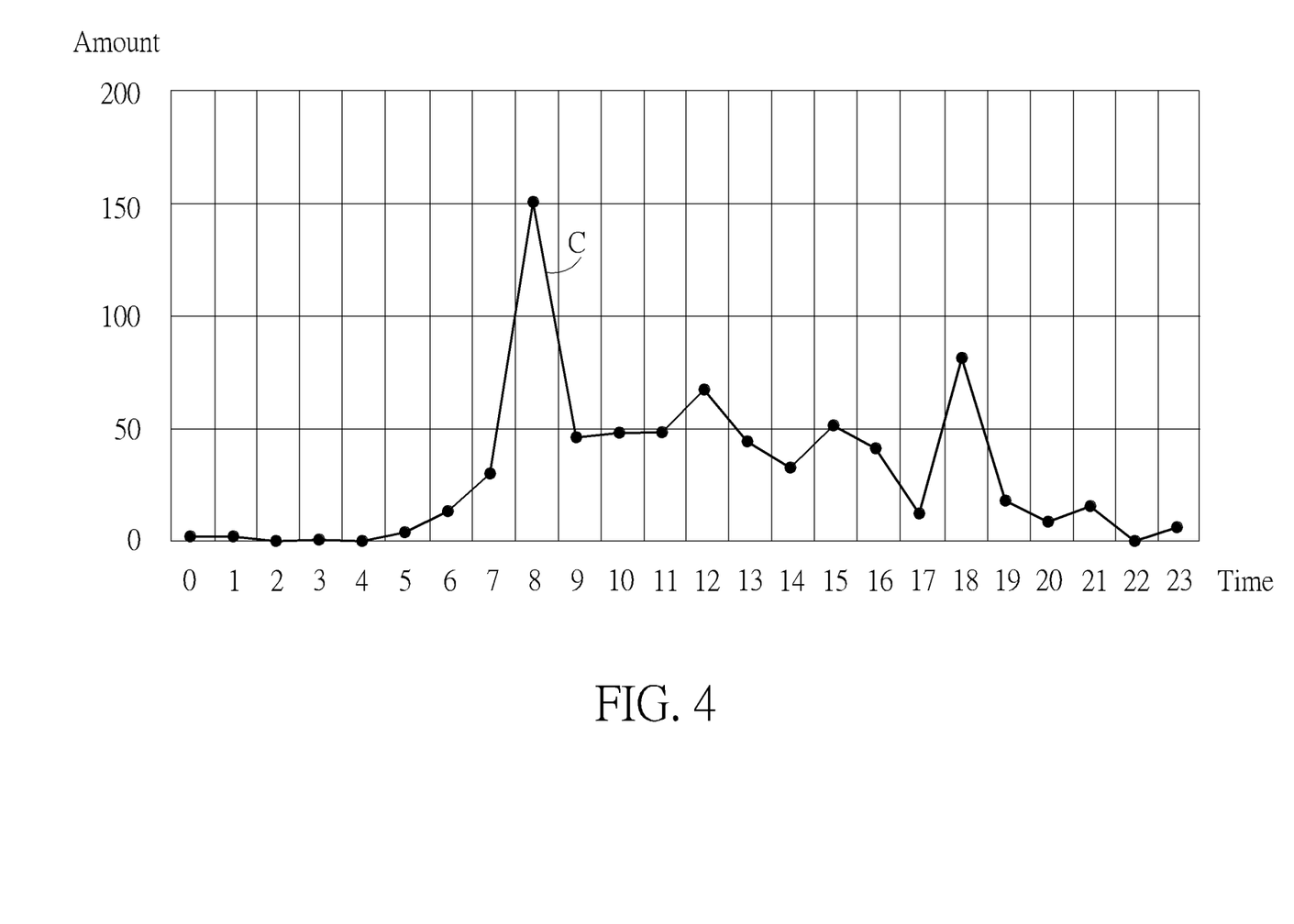
FIG. 4 is an object distribution diagram illustrated by the embodiment shown in FIG. 2.
Figure 5:
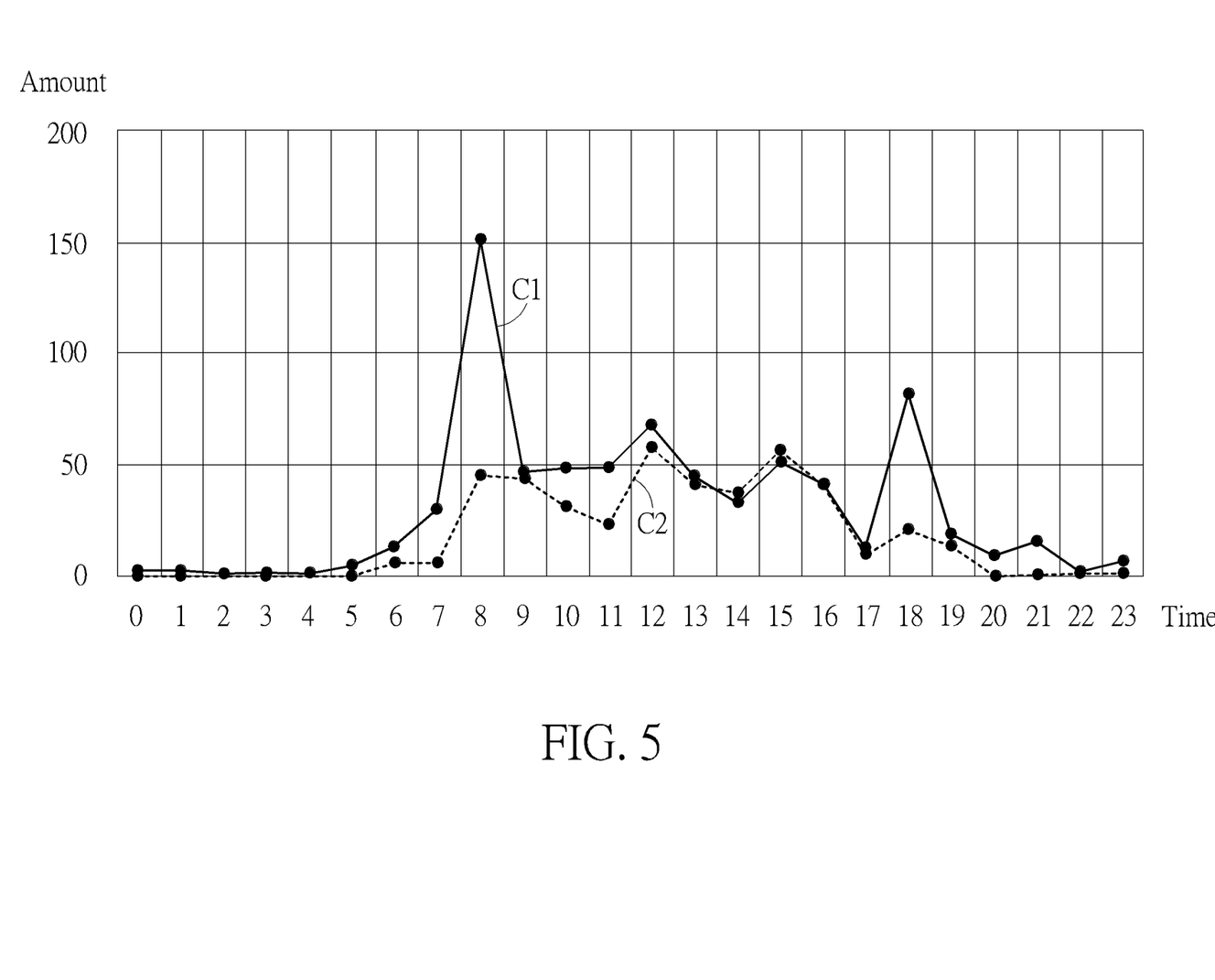
FIG. 5 is an object distribution diagram illustrated by the embodiment shown in FIG. 3.
Figure 6:
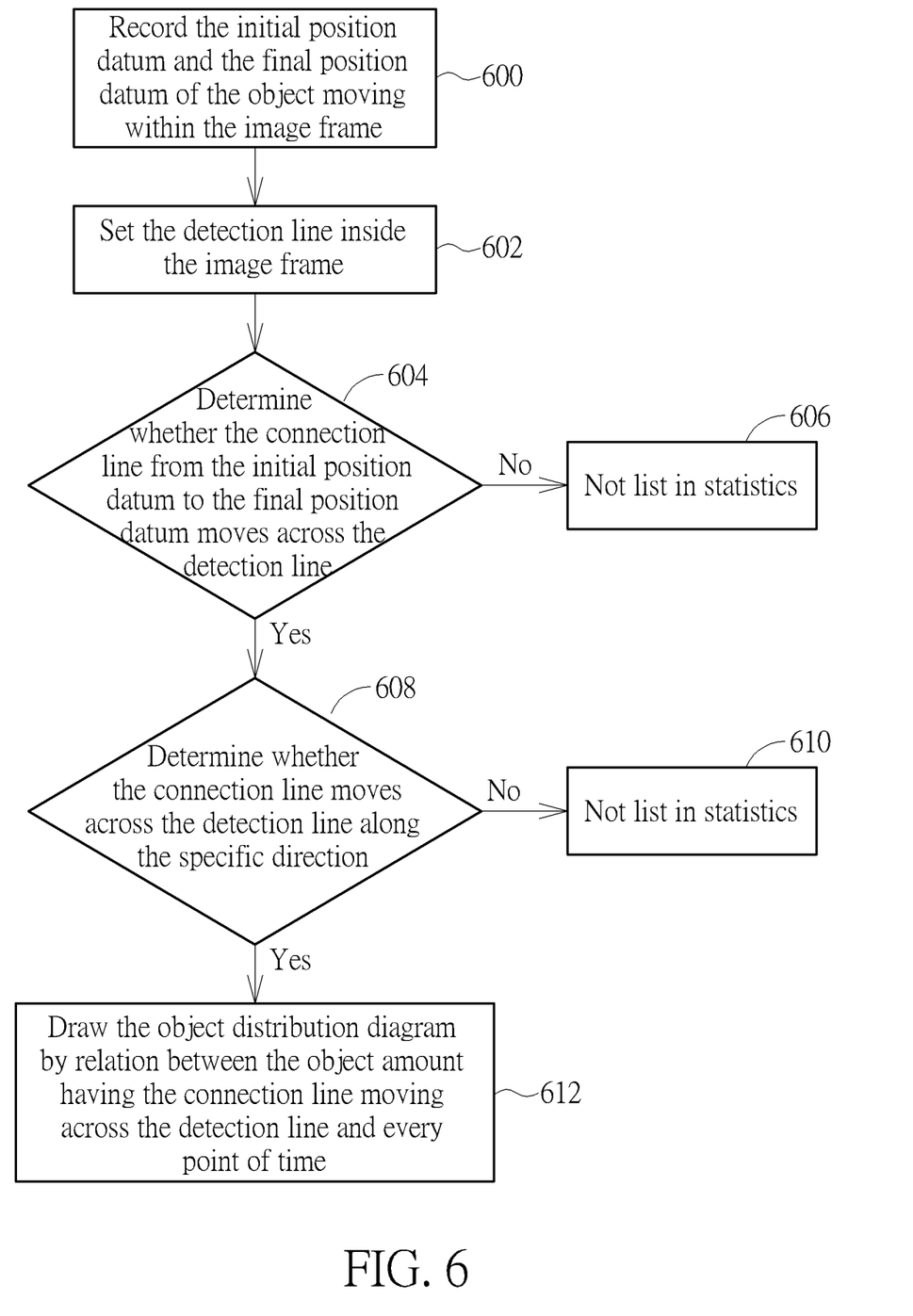
FIG. 6 is a flow chart of an object counting method according to the embodiment of the present invention.

Please refer to FIG. 1 to FIG. 6. FIG. 1 is a functional block diagram of an image processing device 10 according to an embodiment of the present invention. FIG. 2 and FIG. 3 respectively are diagrams of an image frame I displayed by the image processing device 10 according to different embodiments of the present invention. FIG. 4 is an object distribution diagram illustrated by the embodiment shown in FIG. 2. FIG. 5 is an object distribution diagram illustrated by the embodiment shown in FIG. 3. FIG. 6 is a flowchart of an object counting method according to the embodiment of the present invention. The object counting method illustrated in FIG. 6 is suitable for the image processing device 10 shown in FIG. 1. The image processing device 10 can include an image producer 12, a display 14 and an operational processor 16 electrically connected to each other. The image producer 12 is used to capture an image frame I covering a monitoring area, and the display 14 is used to display the image frame I. The user can watch situations happened in the monitoring area by the image frame I. The operational processor 16 can be used to execute the object counting method of the present invention, so as to show object information inside the monitoring area with route distribution property.

The image processing device 10 is applied to capture a monitoring image relevant to the monitoring area, and a plurality of image frames I captured at different timing can be integrated as a monitoring video. Generally, a building inside the monitoring area is not varied, so the present invention is mainly utilized to detect motion of an object inside the monitoring area and analyzes a moving trace of the object during a monitoring period. According to the object counting method, step 600 is executed for a start that the image processing device 10 records varied position data (such as an initial position datum P1, a final position datum P2 and a turning position datum P3) of each object moving within the image frame I. Then, step 602 and step 604 are executed to set a detection line DL inside the image frame I, and then determine whether a connection line OL from the initial position datum P1 to the final position datum P2 of each object moves across the detection line DL.

The moving trace of the object inside the monitoring area is irregular mostly. The object counting method of the present invention can select an initial point (such as the initial position datum P1) and a final point (such as the final position datum P2) of the irregular moving trace, and set the connection line OL between the initial position datum P1 and the final position datum P2 as reference for determining whether to move across the detection line DL. However, the present invention further can select the initial point and the final point of a partial section of the irregular moving trace to be the initial position datum P1 and the final position datum P2 of the object counting method. Moreover, the object counting method of the present invention further can optionally establish a connection line OL' from the initial position datum P1 to the final position datum P2 through the turning position datum P3, and determine whether the connection line OL' moves across the detection line DL for execution of step 604.

The detection line DL can be manually set by the user; for example, an input device such like the mouse and the touch panel can be used to draw a line inside the image frame I to be the detection line DL, and the detection line DL can be a straight line, an arc line or a bending line according to user's demand. The detection line DL further can be automatically drawn by the image processing device 10 according to user's habit or an object distribution density. The embodiment shown in FIG. 2 has the single detection line DL drawn inside the image frame I. As shown in FIG. 3, step 602 of the object counting method can be used to simultaneously draw a plurality of detection lines DL1 and DL2 inside the image frame I, and accordingly step 604 can be used to determine whether the connection line OL moves across the detection lines DL1 and DL2; for example, step 604 may determine the connection line OL does not move across the detection lines DL1 and DL2 because the connection line OL1 moves across the detection line DL1 but not through the detection line DL2. The detection lines DL1 and DL2 shown in FIG. 3 not only can be marked by different numerals (such as symbols R1 and R2), but also can be marked by different colors for identification. Manners of setting and marking the detection line are not limited to the above-mentioned embodiment, which depend on user's demand.

While the connection line OL does not move across the detection line DL, the object related to the foresaid connection line OL is represented as an uninterested datum, so step 606 is executed to not list in statistics; the object related to the connection line OL is represented as an interested datum while the connection line OL moves across the detection line DL. In another possible embodiment of the present invention, step 608 can be executed to determine whether the connection line OL moves across the detection line DL along a specific direction D. As shown in FIG. 2 and FIG. 3, the object counting method can be used to compute an amount of the object departing from the elevator, so that the connection line OL moving across the detection line DL along the specific direction D conforms to a condition of the statistics. If the connection line OL does not move across the detection line DL along the specific direction D, step 610 is executed to not list in the statistics. If the connection line OL moves across the detection line DL along the specific direction D, the related object is represented as the interested datum, and step 612 is executed to draw the object distribution diagram by relation between the amount of the object having the connection line OL moving across the detection line DL and every point of time in a movement of the object. The object counting method is able to design that the connection line OL moving across the detection line DL without consideration of the specific direction D can conform to the condition of the statistics, which means step 608 is omitted herein for simplicity.

As shown in FIG. 2 and FIG. 4, the image frame I has the single detection line DL, and the object counting method can draw a distribution curve C by the relation between the amount of the object having the connection line OL moving across the detection line DL and every point of time in the movement of the object. As shown in FIG. 3 and FIG. 5, the image frame I has the detection line DL1 and DL2, and the object counting method can respectively draw the distribution curves C1 and C2 by relation between the amount of the object having the connection line OL moving across the detection lines DL1 and DL2 and every point of time in the movement of the object, which means distribution of the amount of the object respectively passing through the detection lines DL1 and DL2 during different points of time. In addition, the distribution curves C1 and C2 can be integrated to form a single integrated distribution curve, for representing the amount of the object passing through the detection lines DL1 and DL2 (such as moving across the detection line DL1 and then moving across the detection line DL2 along the specific direction D) distributed at different points of time; besides, the distribution curves C1 and C2 can be used to separately draw the object distribution diagrams.

As the embodiment shown in FIG. 4 and FIG. 5, the object distribution diagram is drawn by the relation between the amount of the object and every distributed points of time, but actual application is not limited to the said embodiment. Any parameters formed by the object moving across the detection line can be used to match with varied points of time in the movement of the object for drawing the object distribution diagram with the route distribution property, and a detailed description is omitted herein for simplicity.

Figure 7:
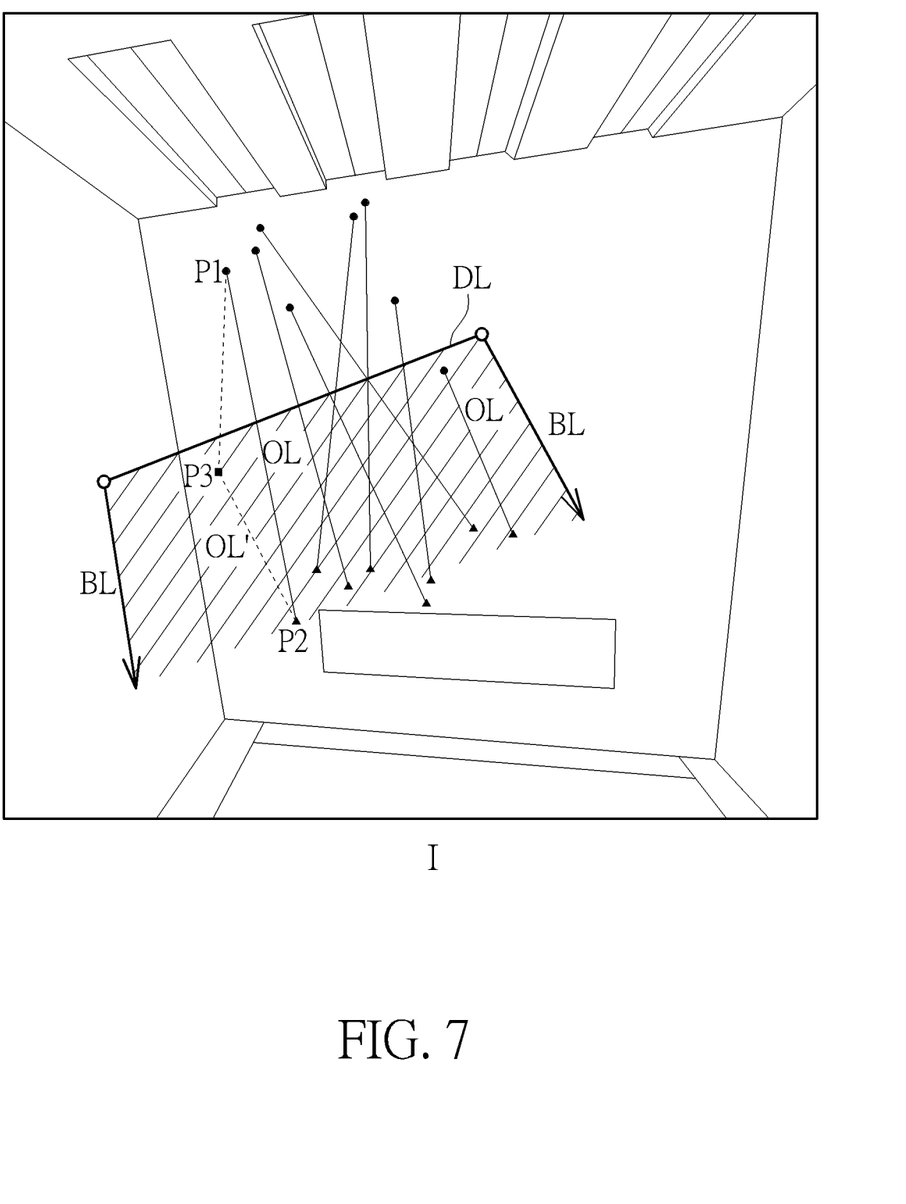
FIG. 7 is a diagram of the image frame I displayed by the image processing device according to another embodiment of the present invention.

Please refer to FIG. 7. FIG. 7 is a diagram of the image frame I displayed by the image processing device 10 according to another embodiment of the present invention. In the other embodiment, the object counting method can draw boundary lines BL on two opposite ends of the detection line DL after setting the detection line DL, so that a detection region can be formed between the detection line DL and the boundary lines BL, as a slash region shown in FIG. 7. The object counting method can determine whether the connection line OL moves across the detection region, so as to decide whether the object related to the connection line OL is the interested datum. Dimensions of the detection region are affected by an orientation and a length of the boundary line BL. The boundary line BL is preferably drawn by the user in manual, or else the boundary line BL further can be automatically drawn by the image processing device 10 via image recognition technique.

The present invention is used to set the detection line DL or the detection lines DL1 and DL2 inside the image frame I, and the image frame I can be an original capturing image generated by the image producer 12 of the image processing device 10. The object counting method of the present invention further can acquire the original capturing image, and then transform the capturing image into the needed image frame I for setting the detection line DL or the detection lines DL1 and DL2. For example, the image producer 12 can be a fisheye camera and the captured image frame is a panoramic fisheye image, so the image frame I is a reduced image transformed by dewarp process. The object counting method of the present invention further can optionally mark an object position datum recorded by the image processing device 10 onto the image frame I, as shown in FIG. 2 and FIG. 3, which means the initial position datum P1, the final position datum P2 and the turning position datum P3 of the object are marked onto the image frame I, so the user can watch and conveniently decide how to draw the detection line DL or the detection lines DL1 and DL2 according to the varied position data. The varied position data may be not marked into the image frame I, and the user can freely draw the detection line DL or the detection lines DL1 and DL2 in accordance with the scene inside the image frame I, such as drawing the detection line DL or the detection lines DL1 and DL2 before the elevator.

In conclusion, the object counting method and the related image processing device of the present invention can record the varied position data of the object moving within the monitoring area to acquire position data of the object moving trace at every point of time, and exclude the uninterested moving trace in accordance with the position, length and orientation of the detection line inside the image frame, so as to draw the object distribution diagram by the relation between the amount of the object having the moving trace crossed with the detection line and its point of time. Comparing to the prior art, the object counting method and the related image processing device of the present invention can clearly show the route distribution property of the object's amount moving along the specific direction in different points of time by a graphic form, for conveniently analyzing and computing flow variation of the object moving along the specific direction.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object counting method having route distribution property, the object counting method comprising:
    recording an initial position datum and a final position datum of any object moving within an image frame;
    setting at least one detection line inside the image frame;
    determining whether a connection line from the initial position datum to the final position datum of each object moves across the detection line; and
    drawing an object distribution diagram by relation between an amount of the object having the connection line moving across the detection line and every point of time in a movement of the object.

2. The object counting method of claim 1, further comprising:
    determining whether the connection line moves across the detection line along a specific direction.

3. The object counting method of claim 1, wherein determining whether the connection line from the initial position datum to the final position datum of each object moves across the detection line comprises:
    drawing boundary lines on two ends of the detection line; and
    determining whether the connection line moves across a detection region formed by the detection line and the boundary lines.

4. The object counting method of claim 1, wherein an amount of the detection line is plural, and the object counting method further comprises:
    determining whether the connection line moves across a plurality of detection lines.

5. The object counting method of claim 4, further comprising:
    marking the plurality of detection lines by different numerals or colors.

6. The object counting method of claim 4, wherein while the connection line moves across the plurality of detection lines, the object counting method draws the object distribution diagram by relation between the amount of the object having the connection line simultaneously moving across the plurality of detection lines and every point of time in the movement of the object, or draws a plurality of object distribution diagrams by relation between the amount of the object having the connection line respectively moving across each of the plurality of detection lines and every point of time in the movement of the object.

7. The object counting method of claim 1, wherein the detection line is a straight line, an arc line or a bending line.

8. The object counting method of claim 1, wherein the object counting method is applied to an image processing device, and the object counting method further comprises:
    setting a capturing image generate by the image processing device as the image frame.

9. The object counting method of claim 1, wherein the object counting method is applied to an image processing device, and the object counting method further comprises:
    acquiring a capturing image generate by the image processing device; and
    transforming the capturing image into the image frame.

10. The object counting method of claim 1, wherein setting the at least one detection line inside the image frame comprises:
    marking the initial position datum and the final position datum onto the image frame so as to set the detection line inside the marked image frame.

11. The object counting method of claim 1, further comprising:
    adjusting a length of a time interval represented by a horizontal axis of the object distribution diagram so as to draw a new object distribution diagram.

12. The object counting method of claim 1, wherein determining whether the connection line from the initial position datum to the final position datum of each object moves across the detection line comprises:
    recording a turning position datum of each object moving within the image frame; and
    determining whether the connection line from the initial position datum to the final position datum through the turning position datum of each object moves across the detection line.

13. The object counting method of claim 1, wherein the initial position datum and the final position datum are part of a moving trace about the object inside the image frame.

14. An image processing device having route distribution property, the image processing device comprising:
    an image producer adapted to capture an image frame;

a display adapted to display the image frame; and an operational processor electrically connected to the image producer and display, the operational processor being adapted to record an initial position datum and a final position datum of any object moving within an image frame, to set at least one detection line inside the image frame, to determine whether a connection line from the initial position datum to the final position datum of each object moves across the detection line, and to draw an object distribution diagram by relation between an amount of the object having the connection line moving across the detection line and every point of time in a movement of the object.

15. The image processing device of claim 14, wherein the operational processor is further adapted to determine whether the connection line moves across the detection line along a specific direction.

16. The image processing device of claim 14, wherein the operational processor is further adapted to draw boundary lines on two ends of the detection line, and to determine whether the connection line moves across a detection region formed by the detection line and the boundary lines.

17. The image processing device of claim 14, wherein an amount of the detection line is plural, and the operational processor is further adapted to determine whether the connection line moves across a plurality of detection lines.

18. The image processing device of claim 17, wherein while the connection line moves across the plurality of detection lines, the operational processor is further adapted to draw the object distribution diagram by relation between the amount of the object having the connection line simultaneously moving across the plurality of detection lines and every point of time in the movement of the object, or draws a plurality of object distribution diagrams by relation between the amount of the object having the connection line respectively moving across each of the plurality of detection lines and every point of time in the movement of the object.

19. The image processing device of claim 14, wherein the operational processor is further adapted to record a turning position datum of each object moving within the image frame, and to determine whether the connection line from the initial position datum to the final position datum through the turning position datum of each object moves across the detection line.

20. The image processing device of claim 14, wherein the initial position datum and the final position datum are part of a moving trace about the object inside the image frame.

* * * * *